(12) United States Patent
Goto

(10) Patent No.: US 6,877,913 B2
(45) Date of Patent: Apr. 12, 2005

(54) CARD TYPE OPTICAL TRANSCEIVER MODULE

(75) Inventor: Akio Goto, Tokyo (JP)

(73) Assignee: NEC Corporation, Tokyo (JP)

( * ) Notice: Subject to any disclaimer, the term of this patent is extended or adjusted under 35 U.S.C. 154(b) by 61 days.

(21) Appl. No.: 10/643,996

(22) Filed: Aug. 20, 2003

(65) Prior Publication Data

US 2004/0175079 A1 Sep. 9, 2004

(30) Foreign Application Priority Data

Aug. 23, 2002 (JP) ........................................ 2002-242769

(51) Int. Cl.[7] .......................... G02B 6/43; H04B 10/42
(52) U.S. Cl. ........................... 385/88; 385/94; 398/138; 398/139
(58) Field of Search ............... 385/88–94; 398/138–139

(56) References Cited

U.S. PATENT DOCUMENTS

| | | | |
|---|---|---|---|
| 5,493,437 A | * | 2/1996 | Lebby et al. ............... 398/139 |
| 6,213,651 B1 | * | 4/2001 | Jiang et al. ................... 385/92 |
| 6,402,393 B1 | * | 6/2002 | Grimes et al. ............... 385/89 |

FOREIGN PATENT DOCUMENTS

| | | |
|---|---|---|
| JP | 7-225328 A | 8/1995 |
| JP | 7-93603 B2 | 10/1995 |
| JP | 10-187305 A | 7/1998 |
| JP | 2001-298200 A | 10/2001 |

* cited by examiner

*Primary Examiner*—Akm Enayet Ullah
*Assistant Examiner*—Jerry T Rahll
(74) *Attorney, Agent, or Firm*—Sughrue Mion, PLLC

(57) ABSTRACT

A card type optical transceiver module includes: an optical receptacle having a photoelectric component for converting electrical signals into optical signals and optical signals into electrical signals, an electrical connector electrically connected to an electronic device, a motherboard and a childboard which are separately formed and electrically connect the optical receptacle and the electrical connector, a first cutaway portion provided in the motherboard, and a group of pins electrically connect the boards. The optical receptacle is supported in a housing forming an outer contour of the module. The first cutaway portion accepts the optical receptacle inside to avoid interference between the optical receptacle and the motherboard. The childboard is supported by the housing, and the motherboard is supported by the group of pins and incorporated in the housing, and the electrical connector is provided on an edge surface of the housing.

15 Claims, 13 Drawing Sheets

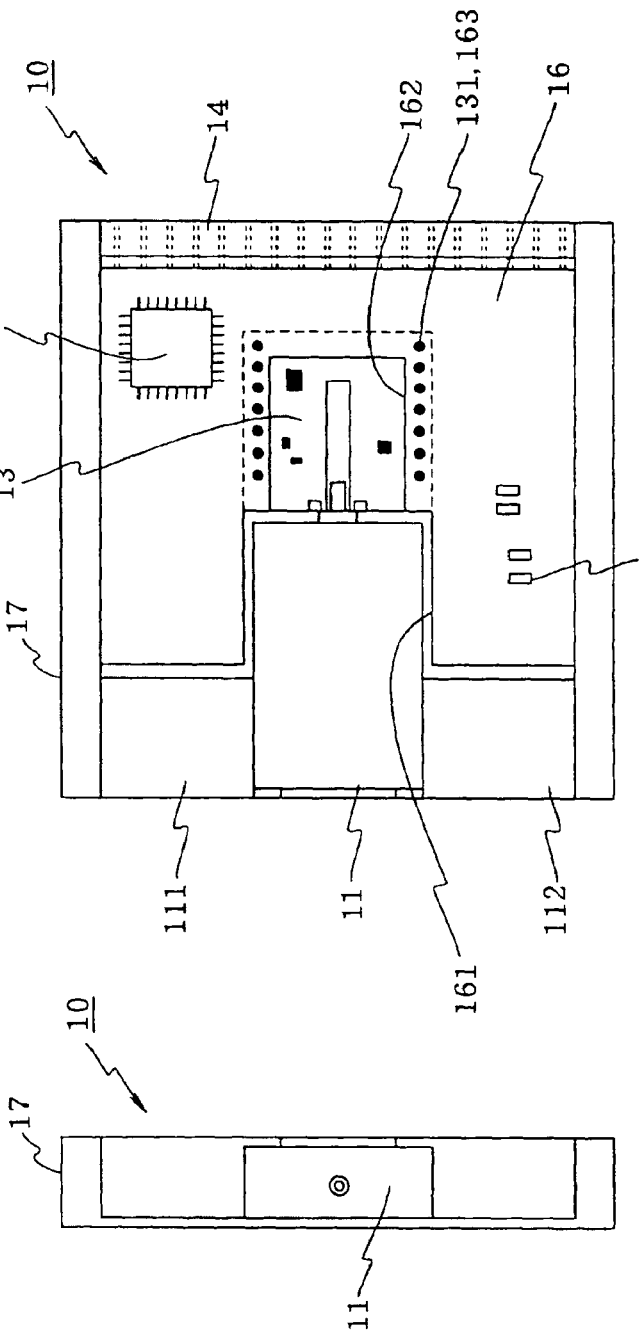

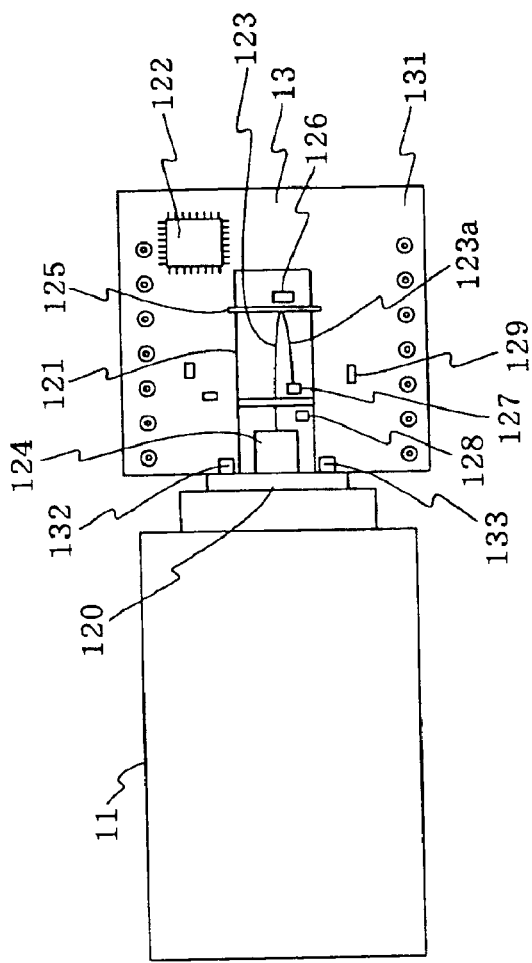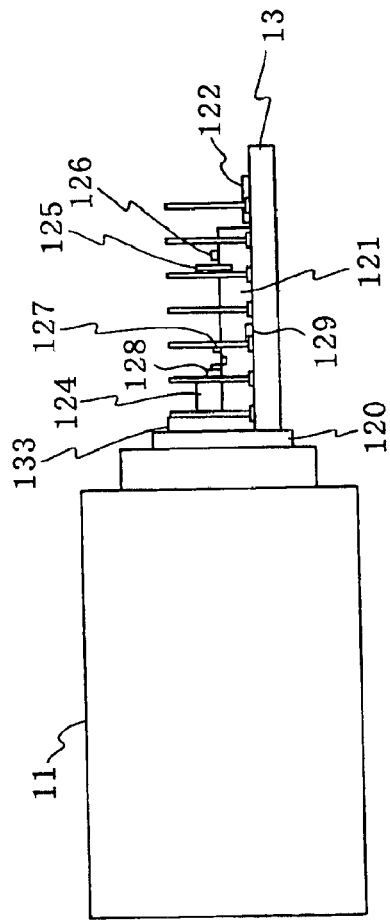
FIG.2(a)
FIG.2(b)

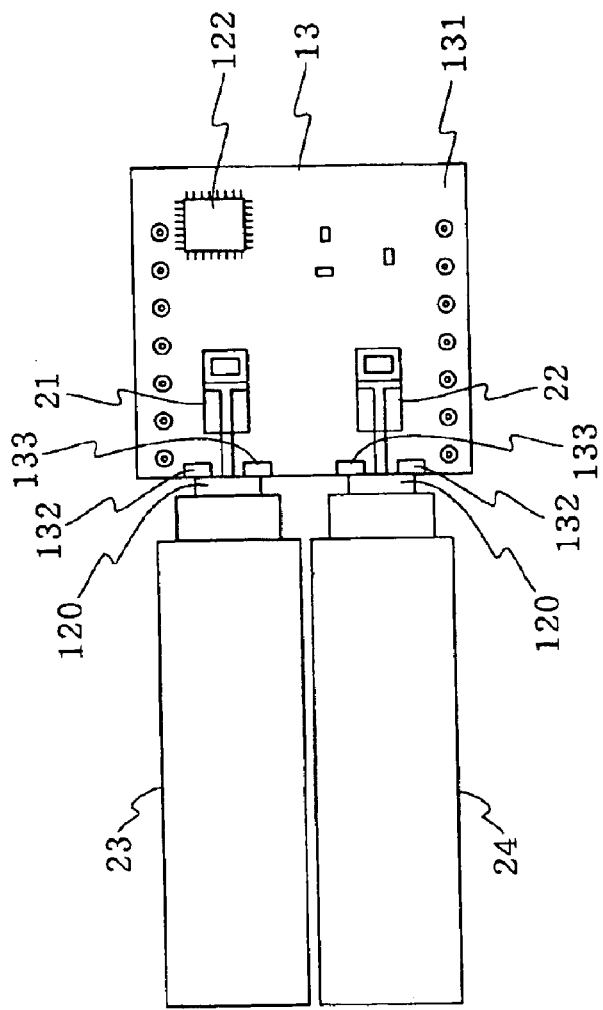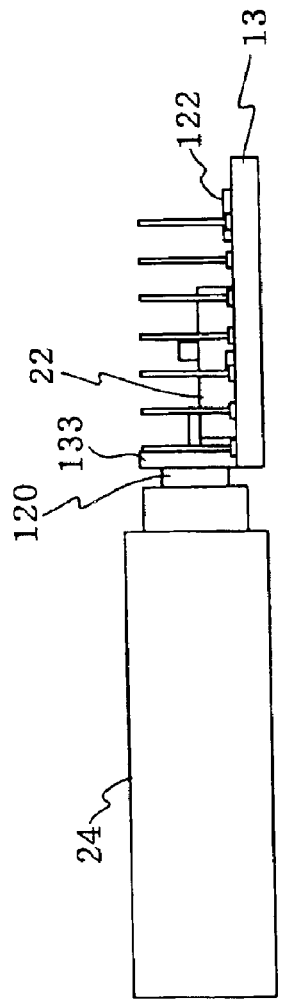
FIG.8(a)
FIG.8(b)

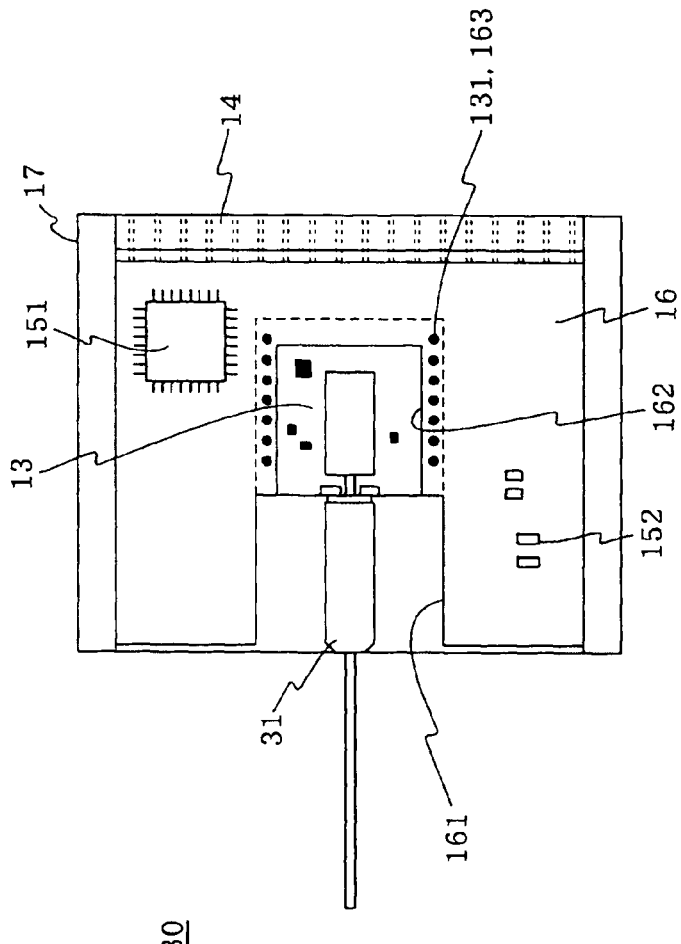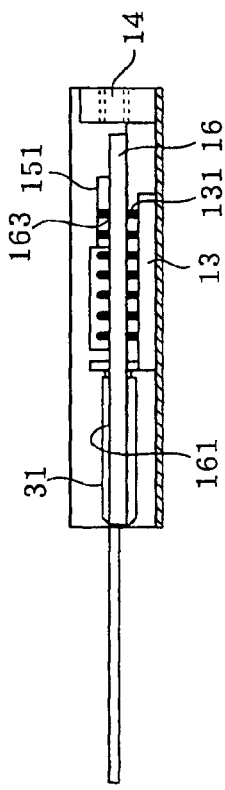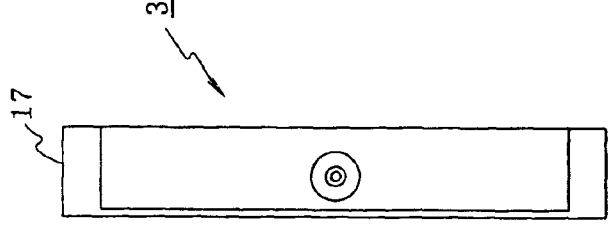
FIG.9(a)
FIG.9(b)
FIG.9(c)

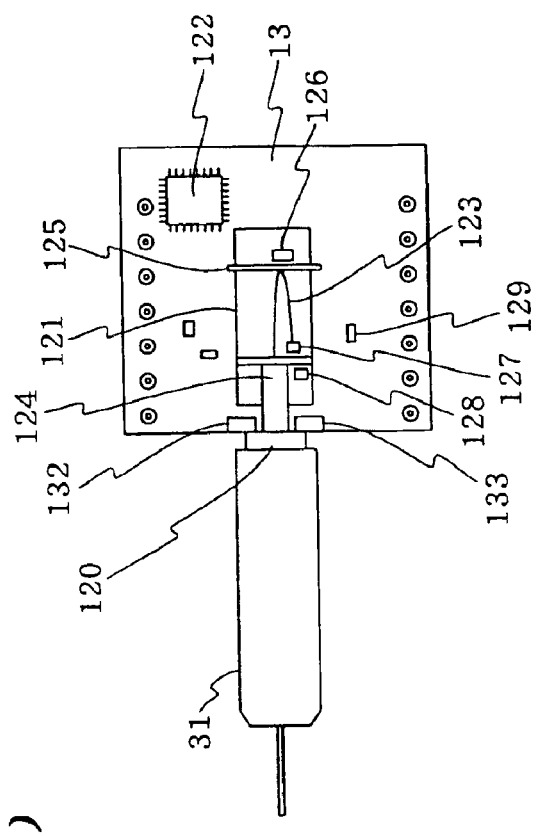
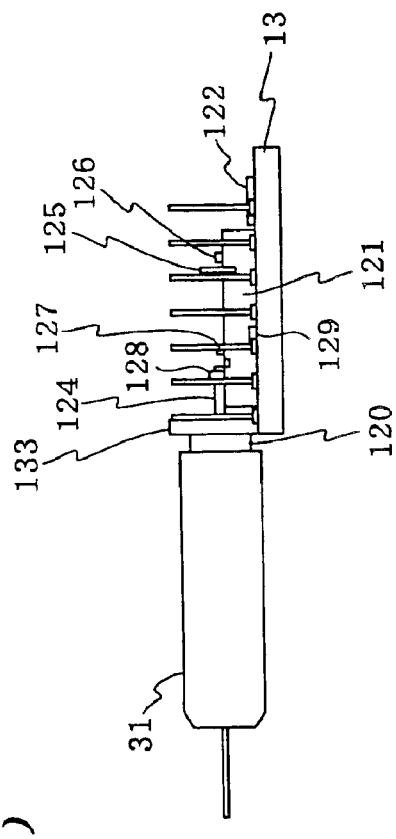
FIG.10(a)
FIG.10(b)

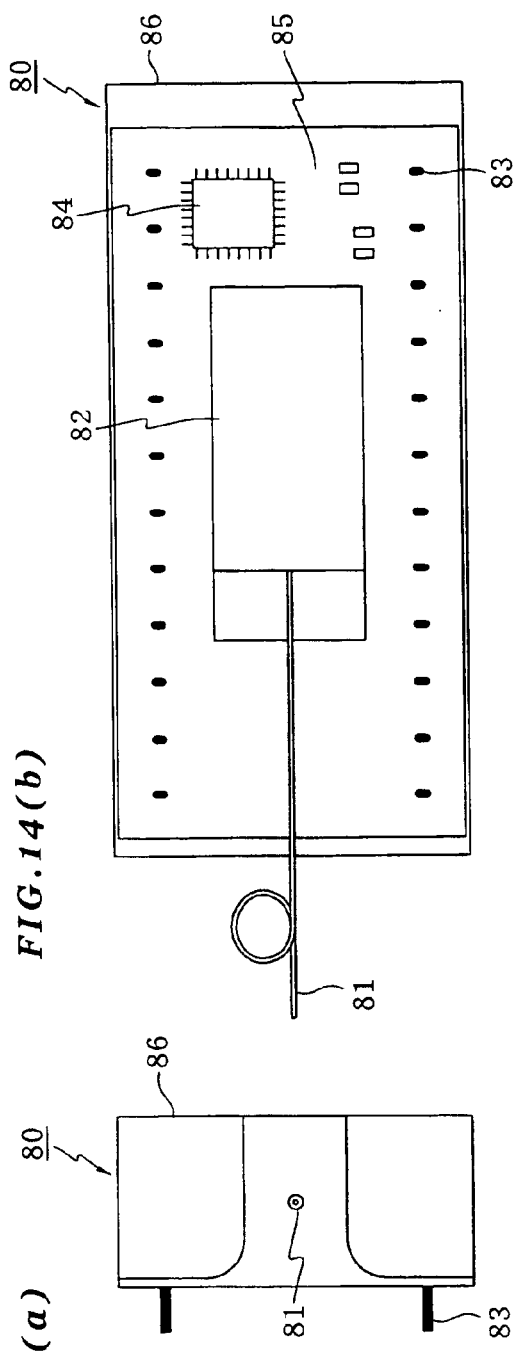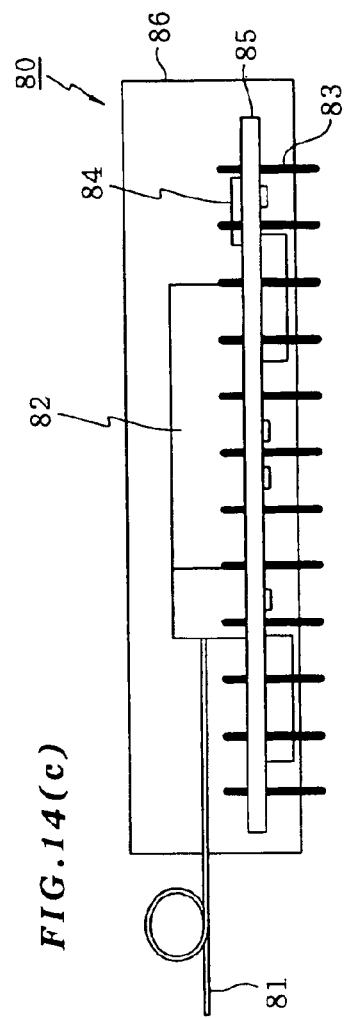
PRIOR ART
FIG.14(a)
FIG.14(b)
FIG.14(c)

CARD TYPE OPTICAL TRANSCEIVER MODULE

BACKGROUND OF THE INVENTION

1. Field of the Invention

The present invention relates to a card type optical transceiver module which is optimum for connecting an optical communication line and a terminal such as a personal computer.

2. Description of the Related Art

Recently, as an optical transceiver module for use in the optical access system, an optical transceiver module having a single-core bi-directional transmission is mainly applied in order to miniaturize and to lower the price. The single-core bi-directional transmission means to perform a transmission and a reception function via a single optical fiber.

Especially, in the case of an optical access system using the Point to Point method, which connects a subscriber and a station of an optical line one to one, one subscriber exclusively uses one line system. Therefore, it is strongly required to lower the price of the optical transceiver module. Further, as optical fibers have come into wide use in the subscriber area, the station needs to accommodate a number of optical transceiver modules corresponding to the number of subscribers. Consequently, the requirement for miniaturizing optical transceiver modules is increased. Further, at the station accommodating a number of optical transceiver modules, an optical receptacle configuration which provides easy handling of optical fibers and a plug-in configuration capable of active insertion/extraction which provides easy exchanging in operation are also required.

Referring to FIGS. 14(a), 14(b) and 14(c), a conventional optical transceiver module 80 has such a configuration that the necessary components are mounted on a printed wiring board 85 using both the front and the back surfaces. On the front surface of the printed wiring board 85, a photoelectric component module 82 having a photoelectric component (not shown) to which an optical fiber 81 is connected, and an electronic component 84 are mounted. In the both edges of the printed wiring board 85, a group of pins 83, which are to be connected to an electronic device (not shown), are provided penetrating from the front surface to the back surface. The printed wiring board 85 on which the necessary components are mounted, is incorporated in a housing 86. An optical fiber 81 is drawn out from the front of the housing 86, and the group of pins 83 are drawn out from the under surface of the housing 86 in a downward direction. As shown in FIGS. 14(a) to 14(c), various electronic components are also mounted on the back surface of the printed wiring board 85.

Optical signals input from the optical fiber 81 are converted into electrical signals at the photoelectric component in the photoelectric component module 82, and are output to an electronic device (terminal) such as a personal computer via the group of pins 83. Electrical signals input from the group of pins 83 are converted into optical signals at the photoelectric component in the photoelectric component module 82, and output to an optical line via the optical fiber 81. The electronic component 84 may be an IC or a chip component, which performs processing of the electrical signals, controlling driving of the photoelectric component module 82, and the like.

As described above, the conventional optical transceiver module 80 has such a configuration that the electronic components and the like are mounted on the printed wiring board 85 using both the front and the back surfaces. Therefore, it is extremely difficult to thin the thickness of the housing 86. More specifically, the height of the photoelectric component module 82 may not be lowered to the height less than that of the photoelectric component to which the optical fiber 81 is connected. Turning to the printed wiring board 85, it mounts the electronic components and the like using both the front and the back surfaces, so that the height of the printed wiring board, to which the heights of the mounted components are added, may not be lowered beyond the limit. Accordingly, there is a limit in realizing a thin module by lowering the height of the housing 86.

As an idea to lower the height of the housing 86, it may be considered to mount the electronic components on one surface of the printed wiring board 85 in concentration. In this case, although it is possible to thin the housing 86, the horizontal size of the housing 86 corresponding to a lengthwise direction of the printed wiring board 85 is enlarged, which may not work as an effective solution.

Further, the group of pins 83 in the housing 86 extends from the bottom of the housing 86. Therefore, when the optical transceiver module 80 is to be mounted, a space for inserting/extracting the group of pins 83 must be kept in an up and down direction of the housing 86 (in a heightwise direction of the housing 86). This impedes to enhance the mounting density by closely mounting the optical transceiver module 80.

SUMMARY OF THE INVENTION

It is therefore an object of the present invention to provide a card type optical transceiver module, a card size of which is realized by achieving a thinned housing and a thin type with which the optical transceiver module can be mounted closely.

In order to achieve the aforementioned object, an optical transceiver module of the present invention comprises: an optical receptacle having an optical module for converting an electrical signal into an optical signal, and in reverse, an optical signal into an electrical signal, respectively; an electrical connector electrically connected to an electronic device; a motherboard and a childboard which are separately formed and electrically connect the optical receptacle and the electrical connector; a first cutaway portion provided in the motherboard; and a group of pins electrically connect the motherboard and the childboard. The present invention is configured in such a manner that the optical receptacle is supported in a housing which forms the outer contour of the card type optical transceiver module, the first cutaway portion accepts the optical receptacle inside so as to avoid interference between the optical receptacle and the motherboard, the childboard is supported by the housing, the motherboard is supported by the group of pins and incorporated in the housing, and the electrical connector is disposed on the edge surface of the housing.

According to the present invention, the optical receptacle is supported in the housing which forms the outer contour of the card type optical transceiver module. In this case, the first cutaway portion accepts the optical receptacle inside so as to avoid interference between the optical receptacle and the motherboard. The childboard is supported by the housing, the motherboard is supported by the group of pins and incorporated in the housing, and the electrical connector is disposed on the edge surface of the housing.

Accordingly, the elements defining the height of the housing are the optical receptacle and the electrical connector. Although the motherboard and the childboard are arranged in the housing in addition to these elements, the optical receptacle is accepted in the cutaway portion of the motherboard, so that these boards and the optical receptacle are never piled in an up and down direction. Therefore, the height of the housing can be lowered by at least the thickness of the boards. Further, lowering the heights of the optical receptacle and the electrical connector directly leads to lowering the height of the card type optical transceiver module. Besides, considering the fact that various developments for lowering the heights of the optical receptacle and the electrical connector are performed in each single component, the height of the card type optical transceiver module can be lowered rather easily.

Since a card type optical transceiver module is used by connecting it to a terminal such as a personal computer, there is a circumstance not allowing it to be larger in volume than it needs, in order to be used for general purposes. Under this circumstance, an effect of the present invention, in which the thickness of the board can be deducted from the heightwise size of the housing, greatly contributes to thin the module. Further, the electrical connector is disposed on the edge surface of the housing along the motherboard, and the electrical connector and the motherboard are arranged laterally in parallel, while the optical receptacle is accepted in the first cutaway portion of the motherboard. As a consequence, the components can be incorporated in the housing by effectively utilize the inner space of the housing without any influence of the motherboard, and moreover, an enlargement of the lateral widthwise size of the housing can be limited to the minimum.

According to the present invention, the childboard may be configured to be supported in the housing at a position below the motherboard but between the electrical connector and the optical receptacle.

With this configuration, the motherboard and the childboard are not the elements defining the height of the housing of the card type optical transceiver module, even though these boards are formed separately, and no hindrance arises as a consequence of the separate formation.

Further, in the present invention, there may be a gap between an inner perimeter of a through hole provided in either one of the motherboard or the childboard and an outer perimeter of a pin among the group of pins which is inserted into and penetrates the through hole.

As a consequence, even if an error is caused in assembling the motherboard and the childboard, the error may be absorbed by the gap. This can prevent the height of the housing from being affected by the error caused in assembling the boards.

Further, in the present invention, the distance between the motherboard and the childboard may be adjusted according to the penetrating length of the pin inserted into the through hole.

This can prevent the height of the housing from being affected by the motherboard and the childboard.

Further, in the present invention, the housing may be configured as a CF card type or a PC card type. A CF card means a compact flash card conforming to PCMCIA (Personal Computer Memory Card International Association) Standards, and a PC card means a standardized card of Personal Computer.

In the present invention, the height of the housing can be lowered as much as possible. Accordingly, the components of the optical transceiver module of the present invention can be incorporated in a housing of a CF card type or a PC card type, which is used in connecting to an extension device for a notebook-type personal computer and a desktop-type personal computer, each used as a terminal. That is to say, the optical transceiver module of the present invention can be configured to have a plug-in structure capable of active insertion/extraction.

Further, in the present invention, the optical receptacle incorporated in the housing may be reinforced against an external force with a reinforcement material.

Since the optical transceiver module of the present invention has the plug-in structure capable of the active insertion/extraction as aforementioned, more stress than is necessary may be applied to the optical receptacle in the course of inserting/extracting. In the present invention, the optical transceiver module is so reinforced that the resistance against the stress is enhanced. Therefore, no problem arises as a consequence of adopting the plug-in structure.

Further, in the present invention, the motherboard has a second cutaway portion, into which the electronic components mounted on the childboard are accepted.

With this configuration, the components mounted on the childboard may not interfere with the motherboard. As a result, the height of the housing can be lowered.

Further, in the present invention, an optical waveguide board of the optical receptacle is mounted on the childboard, and the optical module includes a photo diode for reception, a laser diode for transmission, and a photo diode for monitoring output power of the laser diode.

This enables the components to be mounted separately onto the motherboard, the childboard and the optical waveguide board, respectively, and finally incorporated in the housing. As a result, good quality components and faulty components can be sorted per a board before assembled into the optical transceiver module, leading to an improved manufacturing yield of the optical transceiver module.

In the present invention, the optical module may include a WDM filter which reflects either one of a received light or a transmitting light and allows the other one to penetrate in accordance with each wave length.

Generally, although branching/combining of an optical signal is performed by combining a lens and a filter inclined at an angle of 45°, it is impossible to thin an optical transceiver module with this combination. In contrast, the present invention only uses a WDM filter, so that a thinned module can be easily realized.

Further, in the present invention, the optical module may have either a single-core bi-directional transmission in which a transmission and a reception are performed via a single optical fiber, or a multi-core bi-directional transmission in which a transmission and a reception are performed via a plurality of independent optical fibers.

Further, in the present invention, the optical receptacle may be configured in such a manner that the optical fiber is inserted and fixed in a V-shaped groove of the optical waveguide board.

With this configuration, the optical fiber of the optical receptacle is accepted and fixed in the V-shaped groove. Therefore, the height of the optical receptacle, especially the height of the optical fiber, is absorbed at the V-shaped groove, which contributes to thin the housing.

Further, in the present invention, the childboard may be provided with a stress-dispersing unit which disperses a stress from the optical receptacle.

This can protect the childboard against the stress applied to the optical receptacle when the optical transceiver module is inserted or extracted, and the function of the childboard is not impaired.

Further, in the present invention, the electrical connector may be such a type as being connected through convexes and concaves formed by pins.

Since the electrical connector is connected through convexes and concaves formed by the pins, in addition to the fact that the electrical connector is disposed on the edge surface of the housing along the motherboard, there is no need to keep a space in a heightwise direction of the housing for inserting/extracting the electrical connector, which contributes to reduce the occupancy space for installment.

BRIEF DESCRIPTION OF THE DRAWINGS

FIGS. 1(a), 1(b) and 1(c) show a first embodiment of the optical transceiver module according to the present invention, in which 1(a) is a front view, 1(b) is a plan view, and 1(c) is a side view;

FIGS. 2(a) and 2(b) show an enlarged view of the childboard in FIGS. 1(a) to 1(c), in which 2(a) is a plan view and 2(b) is a side view;

FIGS. 8(a) and 8(b) show an enlarged view of the childboard in FIGS. 7(a) and 7(b), in which 8(a) is a plan view and 8(b) is a side view;

FIGS. 9(a), 9(b) and 9(c) show a third embodiment of the optical transceiver module according to the present invention, in which 9(a) is a front view, 9(b) is a plan view, and 9(c) is a side view;

FIGS. 10(a) and 10(b) show an enlarged view of the childboard in FIGS. 9(a) to 9(c), in which 10(a) is a plan view and 10(b) is a side view;

FIGS. 14(a), 14(b) and 14(c) show a conventional optical transceiver module, in which 14(a) is a front view, 14(b) is a plan view, and 14(c) is a side view.

DETAILED DESCRIPTION OF THE PREFERRED EMBODIMENTS

Figure 3:
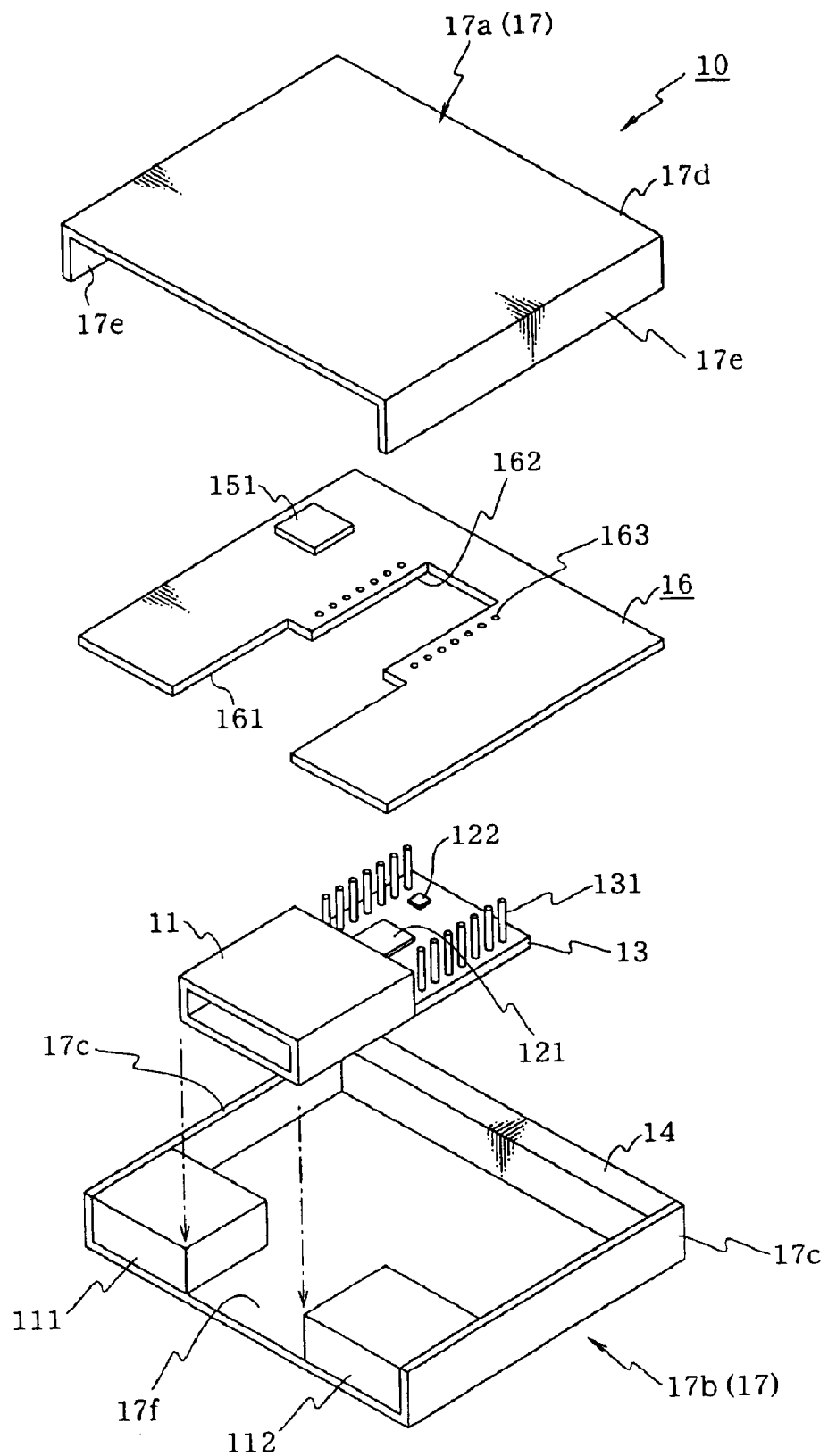
FIG. 3 is an exploded perspective view showing the optical transceiver module in FIGS. 1(a) to 1(c)

Embodiments of the present invention will be described below with reference to the accompanying figures.

(Embodiment 1)

Referring to FIGS. 1(a) to 1(c) and 3, the optical transceiver module 10 of the present invention includes; an optical receptacle 11 having an optical module for converting, an electrical signal into an optical signal, and in reverse, an optical signal into an electrical signal, respectively; an electrical connector 14 electrically connected to an electronic device; a motherboard 16 and a childboard 13 which are separately formed and electrically connect the optical receptacle 11 and the electrical connector 14; a first cutaway portion 161 and a second cutaway portion 162 provided in the motherboard 16; and a plurality of pins (a group of pins) 131 electrically connect the motherboard 16 and the childboard 13.

A housing 17 forming the outer contour of the optical transceiver module is, as shown in FIG. 3, formed to be a card type and is composed of a top metal cover 17a and a bottom frame 17b. The bottom frame 17b is so configured that side walls 17c stand from both edges facing each other of the inner bottom surface 17f, inside of which provides an accommodation space. Using this accommodation space, the optical receptacle 11, the electrical connector 14, the motherboard 16, the childboard 13, and the pins 131 are incorporated in the housing 17. The top metal cover 17a for covering the housing 17 has a top plate 17d for closing the upper opening of the housing 17, and patches 17e hanging down from side edges facing each other of the top plate 17d. When the top plate 17d of the top metal cover 17a closes the upper opening of the housing 17, the patches 17e of the top metal cover 17a contact the side walls 17c of the housing 17 from outside so as to fix the top plate 17d to a position for closing the upper opening of the housing 17.

As for optional components used in information processing devices such as notebook-type and desktop-type computers, international standards are established so as to provide interchangeability. For example, a CF card is standardized as a PCMCIA (Personal Computer Memory Card International Association) Standard compact flash card. A PC card, on the other hand, is internationally standardized as a standardized card of Personal Computer. Since these kinds of cards are configured to have a plug-in structure, it is preferable to use them as a housing of the optical transceiver module.

In order to enable the top metal cover and the bottom frame of the CF card or the PC card to be diverted to the housing 17 of the optical transceiver module, according to the present invention, the optical receptacle 11, the electrical connector 14, the motherboard 16, the childboard 13, and the pins 131 are incorporated in the housing 17 with their heights limited. Here, the height of the optical transceiver module 10, or actually, the height of the housing 17, means a size in a standing direction of the side walls 17c of the housing 17.

The motherboard 16 is, as shown in FIGS. 1(a) to 1(c) and 3, a printed wiring board, having a first cutaway portion 161 into which the optical receptacle 11 is accepted, and a second cutaway portion 162 into which the components mounted on the childboard 12 are accepted, and a printed wiring necessary for an electrical connection is formed on it. On the motherboard 16, as shown in FIGS. 1(a) to 1(c), components such as an LD driving IC 151, chip components 152, a postamp IC (not shown), and chip components (not shown) are mounted. These mounted components have functions of processing electrical signals and controlling driving of the optical transmission components and the like on the childboard 13. Further, the motherboard 16 is formed to be a square shape, so that the side edges of which, facing each other, come into contact with the inner side of the side walls 17c of the housing 17 to thereby fix its position.

The first cutaway portion 161 is opened in a direction from the front to the depth along the motherboard 16, the inner size of which is set to have a size necessary for accepting the outer size of the optical receptacle 11. The first cutaway portion 161 of the motherboard 16 serves, by accepting the optical receptacle 11 inside, to avoid interference between the optical receptacle 11 and the motherboard 16. Accordingly, the optical receptacle 11 is no need to be mounted on the motherboard 16, and the only element defining the height of the housing 17 is the optical receptacle 11. The optical receptacle 11 is incorporated in the housing 17 supported by the inner bottom surface 17f of the housing 17, and is fixed to the inner bottom surface 17f of the housing 17 with such a fixing means as adhesive. Although the optical receptacle 11 is supported by the inner bottom surface 17f of the housing 17, it is not limited to this configuration. It should be noted that any configuration, in which the optical receptacle 11 is supported in the housing 17, may be acceptable.

The electrical connector 14 is, as shown in FIGS. 1(a) to 1(c) and 3, disposed on the edge surface along the motherboard 16 incorporated in the housing 17. The electrical connector 14 is of a type connected through convexes and concaves formed by pins, and is fixed to the inner bottom surface 17f of the housing 17. The part connected through the convexes and concaves formed by the pins faces to a direction along the motherboard 16 in the housing 17. Therefore, the electrical connector 14 is connected through the convexes and concaves to an outer electronic device such as a computer by the pins in a direction along the motherboard 16 in the housing 17.

The second cutaway portion 162 is opened in a direction from the first cutaway portion 161 to the depth along the motherboard 16, the inner size of which is set to have a size necessary for accepting the components mounted on the childboard 13. The components mounted on the childboard 13 are accepted into the second cutaway portion 162 while the board surface outside of the components mounted on the childboard 13 and the board surface of the motherboard 16 are applied each other.

In the portion of the surface of the childboard 13 confronting to the motherboard 16, a plurality of pins 131 are implanted. On the motherboard 16, on the other hand, through holes 163 are provided, into which the pins 131 in the childboard 13 are inserted and penetrate. It should be noted that the through holes (163) may be provided on the childboard 13 and the pins (131) may be implanted in the motherboard 16. Further, there is a gap between the pin 131 and the through hole 163 so as to absorb assembling errors or the like.

As shown in FIGS. 1(a) to 1(c) and 3, the childboard 13 is incorporated in a space formed between the electrical connector 14 and the optical receptacle 11, and is also incorporated in the housing 17 supported by the inner bottom surface 17f of the housing 17. The childboard 13 is fixed to the inner bottom surface 17f of the housing 17 with such a fixing means as an adhesive. Although the childboard 13 is supported by the inner bottom surface 17f of the housing 17, it is not limited to this configuration. It should be noted that any configuration, in which the childboard 13 is supported in the housing 17, may be acceptable.

The pins 131 in the childboard 13 are inserted into and penetrate the through holes 163 of the motherboard 16, and are bonded to the printed wiring on the motherboard 16 by soldering or using an electrically conductive adhesive. With this configuration, the printed wiring of the motherboard 16 and the printed wiring of the childboard 13 are connected electrically, and the motherboard 16 is incorporated in the housing 17 supported by the pins 131.

Further, the distance between the motherboard 16 and the childboard 13 is set according to the penetrating lengths of the pins 131 inserted into the through holes 163. In an example shown in FIGS. 1(a) to 1(c), the penetrating lengths of the pins 131 inserted into the through holes 163 is so set that the front surface of the motherboard 16 comes to almost the center in a heightwise direction of the housing 17. However, the distance between the motherboard 16 and the childboard 13, that is, the heightwise position of the motherboard 16 in the housing 17, is not limited to that shown in the figure.

The childboard 13 is a square printed wiring board, on which the optical receptacle 11, the pre amplifier IC 122, a chip component 129 and chip components (not shown) are mounted, and a printed wiring for electrically connecting these components one another is formed. Further, the childboard 13 transfers and receives electrical signals between the optical receptacle 11, and also transfers electrical signals between the motherboard 16. On the other hand, the motherboard 16 transfers electrical signals between the childboard 13, and between the electrical connector 14.

As shown in FIGS. 2(a), 2(b), 4 and 5, the optical module of the optical receptacle 11 has an optical waveguide board 121, on the surface of which, an optical waveguide pattern 123 is formed. In the optical waveguide board 121, a V-shaped groove 121a is provided, so that the optical fiber 124a is accepted into the V-shaped groove 121a of the optical waveguide board 121 to thereby connect to the optical waveguide pattern 123. In a ferrule 124, a ferrule supporter 120 is press-inserted and fixed. The ferrule 124 is connected to the optical waveguide board 121 avoiding the optical waveguide pattern 123. By this connection, the optical waveguide board 121 is integrally fixed to the optical receptacle 11. It should be noted that the length of the V-shaped groove 121a of the optical waveguide board 121 is set to be short, so that the length of the optical fiber 124a accepted into the V-shaped groove 121a is limited to be short. It should be noted that the optical fiber 124a connects to an outer optical line although it is not shown.

In a short edge of the childboard 13 adjacent to the optical receptacle 11, two columnar stems 132, 133 are implanted. Between the stems 132, 133, the ferrule 124 is inserted into, and the optical receptacle 11 and the optical waveguide board 121 are integrally connected, while the ferrule supporter 120 pushes against the stems 132, 133. The stems 132, 133 form a stress dispersing unit for dispersing a stress applied to the optical receptacle 11. It should be noted that an edge surface of the optical waveguide board 121, if the board is thickened, may be used as a stress dispersing unit instead of the stress dispersing unit formed of the stems 132, 133. In this case, the stress applying to the optical receptacle 11 may be dispersed by the ferrule supporter 120 pushing against the thickened edge surface of the optical waveguide board 121.

In the present invention, assembling is performed by using each of the optical waveguide board 121, the childboard 13 and the motherboard 16 as a unit.

Figure 4:
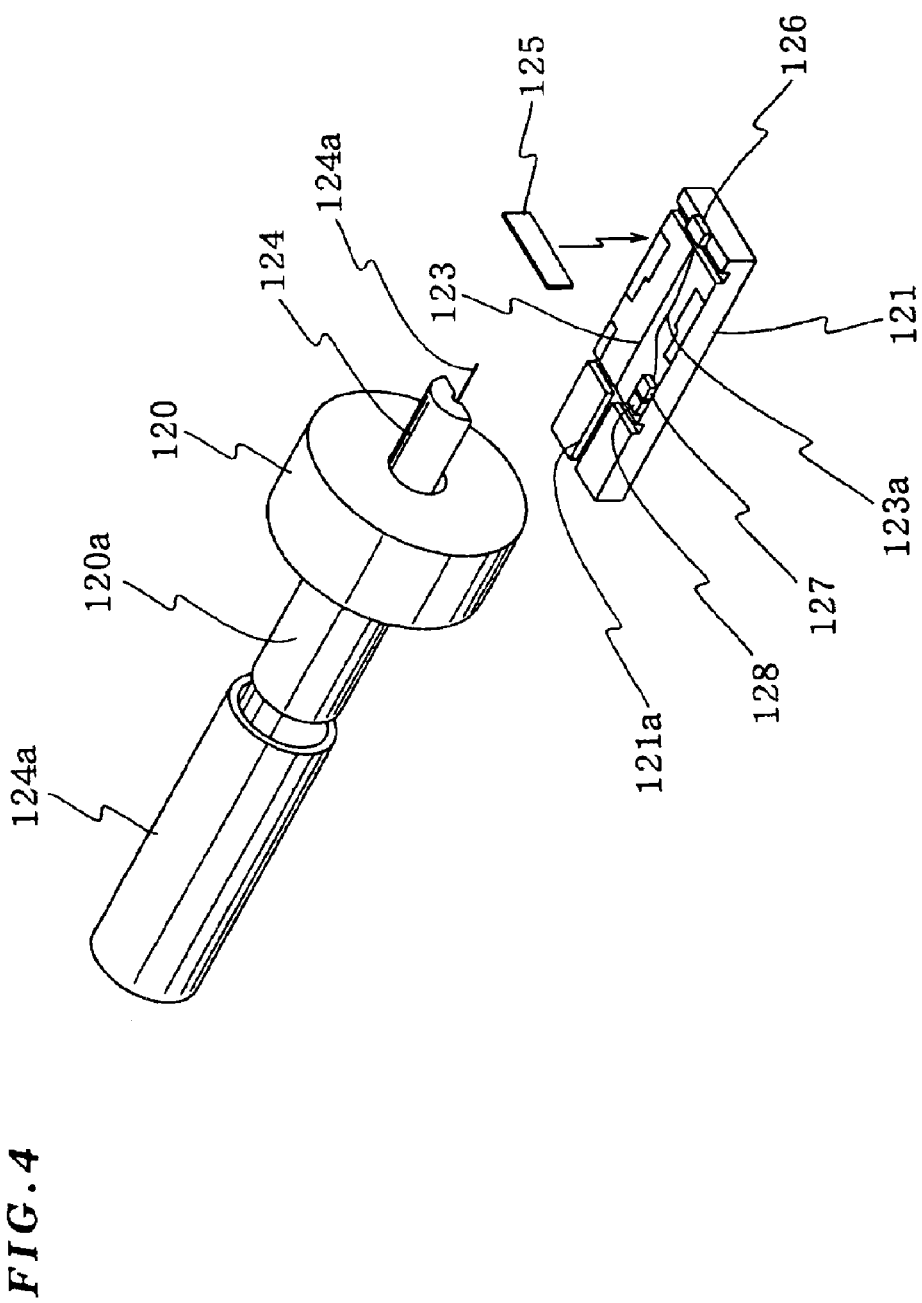
FIG. 4 is an exploded perspective view showing an assembling state of the optical receptacle according to the present invention.
Figure 5:
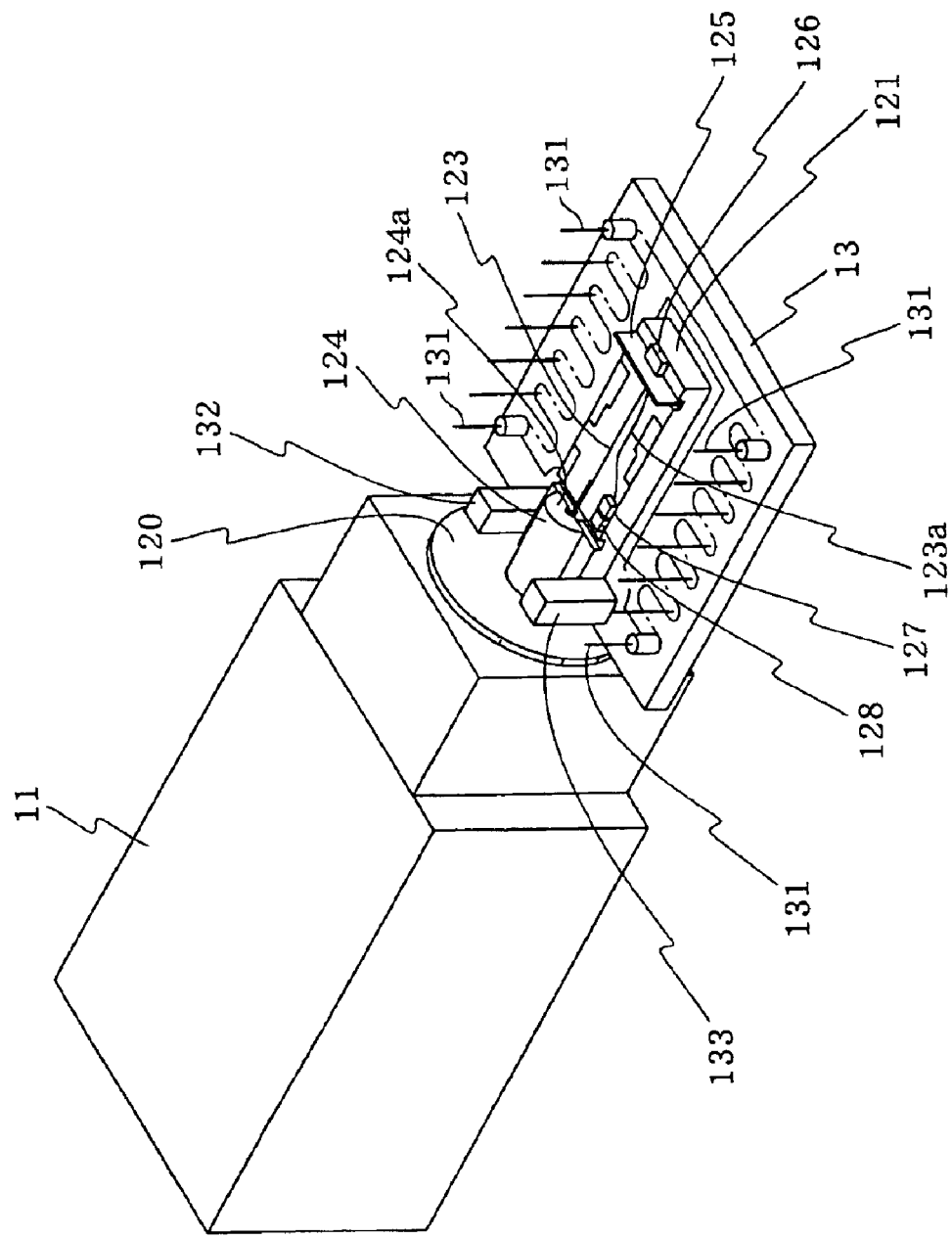
FIG. 5 is an exploded perspective view showing an assembling state of the optical receptacle and the childboard according to the present invention.
Figure 6:
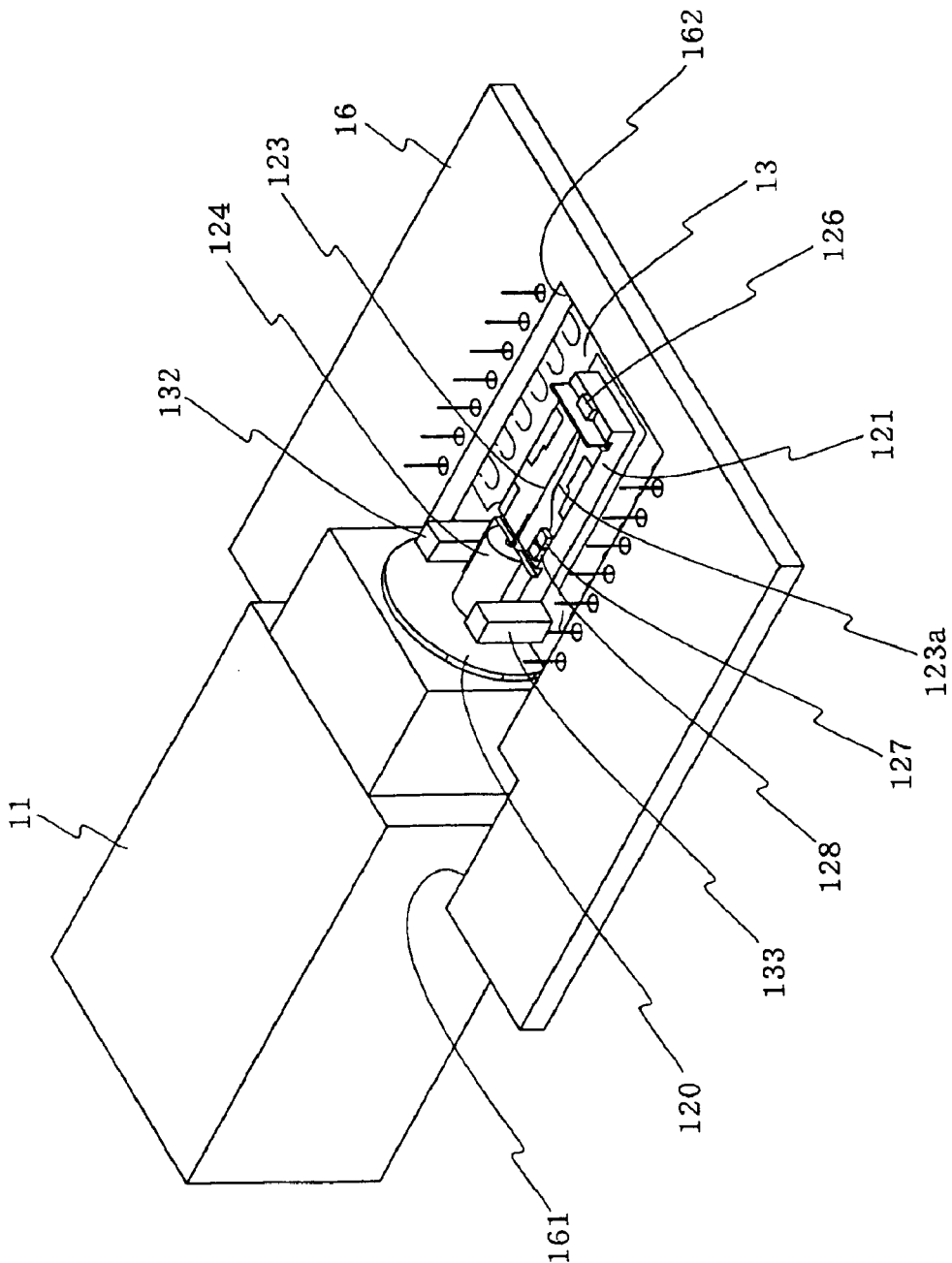
FIG. 6 is an exploded perspective view showing an assembling state of the motherboard and the childboard according to the present invention.

A case in which the optical module of the optical receptacle 11 is assembled about the optical waveguide board 121 will be described in accordance with FIGS. 4 and 5. In assembling the optical module, first, a WDM filter 125 is provided at the end of the waveguide pattern 123 formed on the optical waveguide board 121. The WDM filter 125 has a function to reflect either one of a received light from the optical fiber 124a or a transmitting light to the optical fiber 124a and allow the other one to penetrate in accordance with each wave length. At the end of a waveguide pattern 123a branched from the waveguide pattern 123 on the optical waveguide board 121, a LD 127 for transmission is provided. Further, a PD 128 for monitoring is provided adjacent to the LD 127 for transmission. The waveguide pattern 123a is branched at the position of WDM filter 125. On the opposite side with reference to the WDM filter 125 on the waveguide pattern 123, a PD 126 for reception is provided. Then, as aforementioned, the optical fiber 124a of the optical receptacle 11 is fixed in the V-shaped groove 121a of the optical waveguide board 121 on which these components are mounted, and the ferrule 124 is fixed onto the optical waveguide board 121, so that the optical waveguide board 121 and the optical receptacle 11 are integrally connected as described above. Then, after a split sleeve 120a is provided outside on the ferrule 124, the split sleeve 120a and the ferrule 124 are press-fixed or adhesive-fixed to the ferrule supporter 120, so that the optical receptacle 11 having the optical module is completely assembled. The position of the optical connector with reference to the optical receptacle 11 is set in such a manner that an edge of the split sleeve 120a pushes against the ferrule supporter 120, and the optical connector pushes against the other edge of the split sleeve 120a, so that the split sleeve 120a becomes a prescribed length capable of physically contacting when the optical connector is inserted into the optical receptacle 11. It should be noted that the outer shape of the ferrule supporter 120 may be an easy optional shape although the cylindrical shape is used in the figures.

Next, a case in which assembling is performed about the childboard 13 will be described in accordance with FIGS. 2(a), 2(b), 3 and 5. The optical waveguide board 121 of the optical receptacle 11 is put on the childboard 13 while the two stems 132, 133 in the childboard 13 push against the ferrule supporter 120 in the optical receptacle 11, and the optical waveguide board 121 and the childboard 13 are integrally fixed with an adhesive or the like. As a result, the optical receptacle 11 is mounted on the childboard 13. Then, on the childboard 13, the pre amplifier IC 122, the chip component 129 and the like are mounted. It should be noted here that when the optical waveguide board 121 is mounted on the childboard 13, the ferrule supporter 120, into which the ferrule 124 is press-fixed beforehand, is fixed while pushing against the stems 132, 133 on the childboard 13. Therefore, a stress applied when the optical connector (not shown) is inserted into or extracted from the optical receptacle 11, is not concentrated on the optical waveguide board 121, but is dispersed all over the optical transceiver module 10 through the childboard 13.

Next, a case in which assembling is performed about the motherboard 16 will be described in accordance with FIGS. 1(a) to 1(c), 3 and 6. On the motherboard 16, the LD driving IC 151, the chip component 152 and the like are mounted. Then, as aforementioned, the childboard 13 on which the optical receptacle 11 is mounted is supported by the inner bottom surface 17f of the housing 17, and the optical receptacle 11 is supported by the inner bottom surface 17f of the housing 17, and the childboard 13 and the optical receptacle 11 are incorporated into the housing 17.

Next, the optical receptacle 11 is accepted into the first cutaway portion 161 of the motherboard 16, and the components mounted on the childboard 13 are accepted into the second cutaway portion 162 of the motherboard 16, and the motherboard 16 is arranged above the childboard 13. Then, the pins 131 on the childboard 13 are inserted into the through holes 163 of the motherboard 16, and by adjusting the penetrating lengths of the pins 131 inserted into the through holes 163, the motherboard 16 is arranged at a position almost the center of the height in the housing 17, and the pins 131 are fixed to the motherboard 16. With this configuration, the motherboard 16 is incorporated in the housing 17 supported by the pins 131. In this case, when there are errors in assembling with regard to the arranged position of the motherboard 16, the motherboard 16 can be moved up and down with reference to the pins 131, that is, in a heightwise direction of the housing 17, or moved in a horizontal direction, so as to be arranged at the best position. After the position of the motherboard 16 is set, the electrical connector 14 is disposed on the edge surface of the housing 17 along the motherboard 16. The printed wiring of the motherboard 16 and the electrical connector 14 are connected electrically, and the electrical connector 14 is fixed to the housing 17. Then, in between the optical receptacle 11 and the side walls 17c of the housing 17, reinforcement materials 111, 112 are provided to thereby reinforce the optical receptacle 11.

Finally, the top metal cover 17a of the housing 17 is put onto the bottom metal frame 17b, and the assembling of the optical transceiver module 10 is completed.

Next, the operation of the optical transceiver module 10 according to the present invention will be described.

Optical signals from the LD 127 for transmission propagate through the waveguide pattern 123a and are totally reflected at the WDM filter 125 to the waveguide pattern 123, then propagate through the waveguide pattern 123 so as to be input into the optical fiber 124a in the ferrule 124, and output from the optical receptacle 11 to the optical line.

On the other hand, optical signals input from the optical line to the optical receptacle 11 reach the WDM filter 125 propagating through the waveguide pattern 123, and penetrate the WDM filter 125. The optical signals penetrating the WDM filter 125 are received at the PD 126 for reception.

When received at the PD 126 for reception, the optical signals are converted into electrical signals by the PD 126, which signals are amplified through the pre amplifier IC 122 and a postamp IC (not shown). Here, by using an IC with a clock reproducing function as a postamp IC, a clock reproduction may be performed simultaneously. It should be noted here that as the WDM filter 125, a filter, having a function of reflecting optical signals (prescribed wave length) output from the LD 127 and allowing optical signals (prescribed wave length) input from the optical fiber 124a to penetrate, is used. As for the optical signals output from the LD 127, a part (back light) of which is measured by the PD 128 for monitoring provided behind the LD 127, so that the level fluctuation is monitored.

Further, by assembling the module using the optical waveguide board 121, the childboard 13, and the motherboard 16 each as a unit, it is possible to improve workability in assembling and to absorb assembling irregularity of the components at the time of assembling. Moreover, by setting the childboard 13, on which the optical waveguide board 121 and the like are mounted, to be common, and preparing, for example, several kinds of motherboards 16 on each of which an IC having different operational frequency is mounted, it is possible to easily provide an optical transceiver module 10 having different operational frequency.

Next, the optical transceiver module 10 of the present invention will be described in general.

1. The optical receptacle 11 is incorporated in the housing 17 without any interference from the motherboard 16, instead of a conventional module in which the optical receptacle 11 is piled on the board. Therefore, it is possible to thin the housing 17. Further, the optical receptacle 11 is accepted into the first cutaway portion 161 provided in the motherboard 16, which means that the optical receptacle 11 and the motherboard 16 will never be arranged in parallel in a horizontal direction of the housing 17. Accordingly, in addition to lowering the heightwise size of the housing 17, it is also possible to restrict the size to be enlarged in a horizontal direction of the housing.

2. A plurality of through holes 163 are provided in the motherboard 16, and a plurality of pins 131 are implanted in the childboard 13. The pins 131 are fixed to the board (13 or 16) on a condition that they are inserted into and penetrate the through holes 163. Here, the distance between the motherboard 16 and the childboard 13 is set by adjusting the penetrating lengths of the pins 131 inserted into the through holes 163, depending on, for example, the kind of the optical receptacle 11 mounted on the childboard 13, or depending on size errors. Accordingly, various kinds of optical receptacles 11 of different sizes can be mounted, and the positions of the boards are set with high precision since the size errors are absorbed.

3. The position of the pins 131 in the through holes 163 are adjusted depending on the kind of the optical receptacle 11 mounted on the childboard 13, or depending on the size errors. Accordingly, various kinds of optical receptacles 11 of different sizes can be mounted, and the positions are set with high precision since the size errors are absorbed.

4. Since the module is thinned, the optical receptacle 11 and the housing 17 are susceptible to a damage caused by a stress generated in the optical receptacle 11 at the time of inserting/extracting or oscillating the optical fiber. To cope with the stress, the optical receptacle 11 is reinforced with the reinforcement materials 111, 112, so that the stress is absorbed. This improves the intensity of the optical receptacle 11 and the housing 17.

5. Since the module is thinned, the connecting part between the optical receptacle 11 and the childboard 13 is susceptible to a damage caused by a stress generated in the optical receptacle 11 at the time of inserting/extracting or oscillating the optical fiber. By providing the reinforcement materials 132, 133 on both sides of the connecting part as stress dispersing units, the stress is absorbed. It should be noted that if it is possible to thicken the childboard 13, such a structure that the stress is absorbed only into the side walls of the childboard 13 may be acceptable, without providing the reinforcement materials 132, 133.

6. A socket type electrical connector 14 (equivalent to the conventional group of pins), which has been provided in a hightwise direction conventionally, is provided in a depth direction of the housing 17 along the motherboard 16. Accordingly, a thinned module including the socket type electrical connector 14 can be realized.

7. A CF card size is adopted. Therefore, by diverting the housing 17 and the socket type electrical connector 14 which are in mass-production, compact and thinned modules can be realized, as well as the lower prices. Further, the components for the CF card can also be used in electronic devices on which the optical transceiver module 10 is mounted, which also leads to the lower prices.

8. Generally, it is difficult to thin a photoelectric component realizing a single-core bi-directional transmission (whose function is a transmission/reception performed via a single optical fiber). This is due to the fact that the system uses a transceiver module and a reception module having a coaxial (cylindrical) form, and a branching/combining function of which is performed by combining a lens and a filter inclined at an angle of 45°. In contrast, the present invention only uses a WDM filter, so that a thinned photoelectric component realizing the single-core bi-directional transmission can be easily achieved.

Next, examples of the optical transceiver module 10 according to the present invention will be explained.

Figure 11:
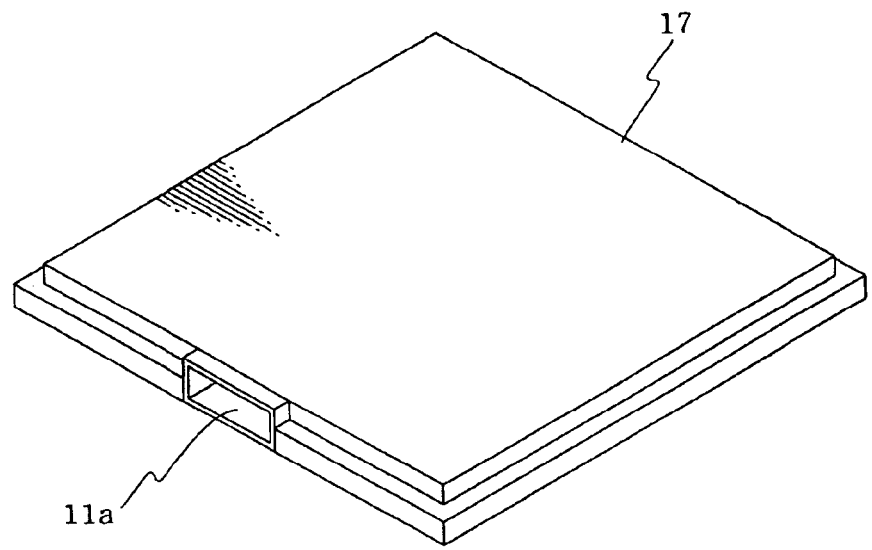
FIG. 11 is a perspective view showing the housing which forms the outer contour of the card type optical transceiver module according to the present invention.
Figure 13:
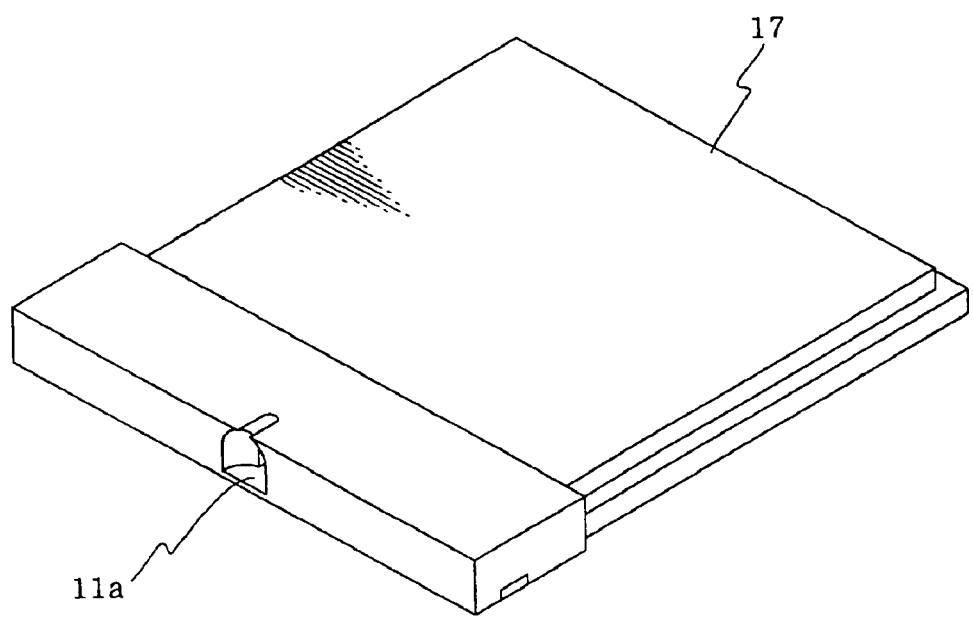
FIG. 13 is a perspective view showing the housing which forms the outer contour of the card type optical transceiver module according to the present invention.

As shown in FIG. 11, the optical transceiver module 10 of the present embodiment uses a general purpose CF card (the top metal cover and the bottom frame) as the housing 17, into which the necessary components of the optical transceiver module can be easily incorporated. More specifically, the international standard for a CF card standardizes that the height of the CF card must be limited to 5 mm or less. In the present invention, a CF card conforming to the Standard has been able to be used as the housing 17. As shown in FIG. 11, the optical receptacle 11 is configured to be able to fit, accepting a general purpose optical connector 11a with D (diameter) 1.25 mm (for example, an MU connector and an LC connector). As the electrical connector 14, a socket type electrical connector, having an active insertion/extraction function, for general CF cards is used. It should be noted that a PC card (the top metal cover and the bottom frame), substituted for a CF card size, has also been able to be used as the housing 17 to easily incorporate the necessary components of the optical transceiver module, as shown in FIG. 13.

(Embodiment 2)

Figures 7A, 7B:
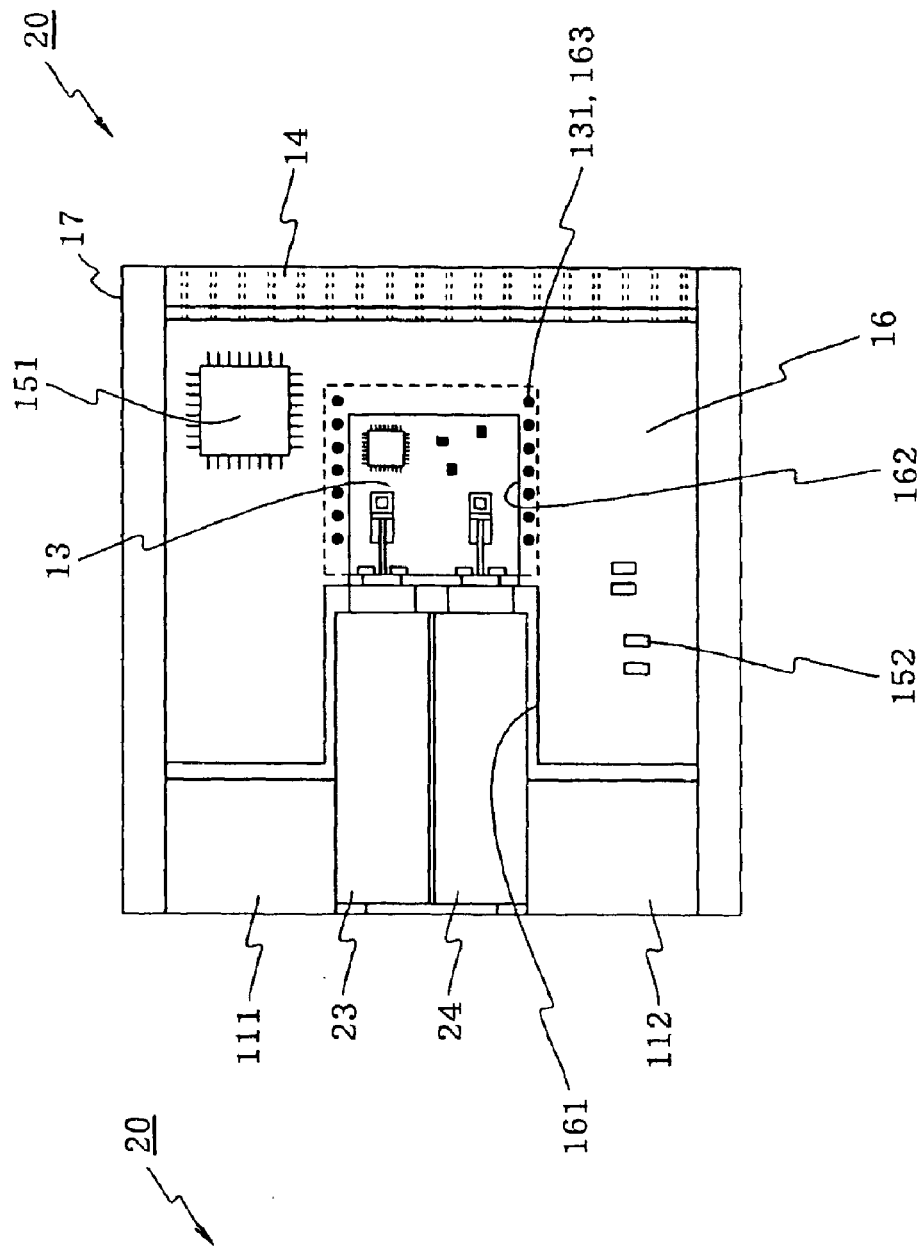
FIGS. 7(a) and 7(b) show a second embodiment of the optical transceiver module according to the present invention, in which 7(a) is a front view and 7(b) is a plan view.

FIGS. 7(a) and 7(b) show a second embodiment of the optical transceiver module according to the present invention, in which 7(a) is a front view and 7(b) is a plan view. In FIG. 7(b), a part of the housing is omitted for convenience. FIGS. 8(a) and 8(b) show an enlarged view of the childboard in FIGS. 7(a) and 7(b), in which 8(a) is a plan view and 8(b) is a side view. The second embodiment will be described below referring to these figures. It should be noted that like reference numerals are used to denote like components as shown in FIGS. 1(a) to 1(c) and 2(a) and 2(b).

The optical transceiver module 10 of the first embodiment shown in FIGS. 1(a) to 1(c) is configured with one optical receptacle 11, since it has a bi-directional function with a single-core optical fiber.

In contrast, an optical transceiver module 20 of the second embodiment is configured with optical receptacles 23, 24 having two cores, since it has a twin-core structure in which each of a receiver 21 and a transmitter 22 has a single-core optical fiber, respectively. The optical transceiver module 20 of the second embodiment has the same operation and effects as that of the optical transceiver module 10 of the first embodiment.

(Embodiment 3)

FIGS. 9(a), 9(b) and 9(c) show a third embodiment of the optical transceiver module according to the present invention, in which 9(a) is a front view, 9(b) is a plan view, and 9(c) is a side view. In FIGS. 9(b) and 9(c), a part of the housing is omitted for convenience. FIGS. 10(a) and 10(b) show an enlarged view of the childboard in FIGS. 9(a) to 9(c), in which 10(a) is a plan view and 10(b) is a side view. The third embodiment will be described below referring to these figures. It should be noted that like reference numerals are used to denote like components as shown in FIGS. 1(a) to 1(c) and 2(a) and 2(b).

The optical transceiver module 10 of the first embodiment shown in FIGS. 1(a) to 1(c) uses an optical receptacle 11 of a concave type 11a as shown in FIG. 11, into which an optical connector is inserted from outside. However, dust and foreign substances might be entered from the optical receptacle 11 depending on the using circumstances.

Figure 12:
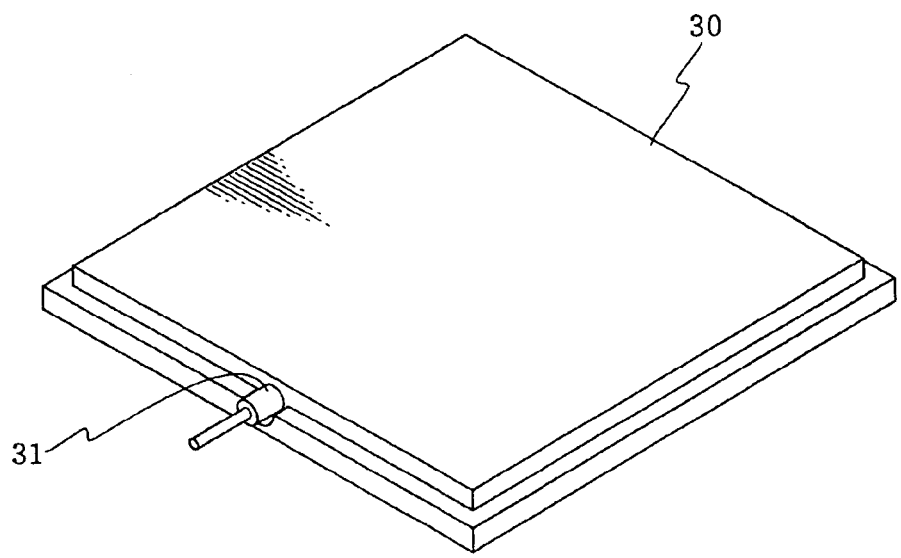
FIG. 12 is a perspective view showing the housing which forms the outer contour of the card type optical transceiver module according to the present invention.

Therefore, in an optical transceiver module 30 of the third embodiment, a pigtail code 31 in which an optical fiber is soldered or bonded to the childboard 13 is used as an optical receptacle (see FIG. 12). The optical transceiver module 30 of the third embodiment also has the same operation and effects as that of the optical transceiver module 10 of the first embodiment.

Needless to say, it should be noted that the present invention is not limited to the aforementioned embodiments. In other words, the optical transceiver module of the present invention may be used as an optical transceiver module described in the aforementioned embodiments, but it is not limited to this embodiment. It may be used as an optical transmitter module, an optical receiver module, an optical media converter module, and the like, without any modification to the structure. More specifically, a single-core bi-directional transmission means to perform a transmitting/receiving function via a single optical fiber. In general, an optical transceiver module usually has either one of a transmitting function or a receiving function. Such an optical transceiver module is called an optical transmitter module or an optical receiver module. An embodiment of the present invention shown in FIG. 1 is one type of an optical transceiver module, which is intended to be so-called optical transmitter module or optical receiver module, having either one of a transmitting function or a receiving function. Another embodiment of the present invention shown in FIG. 8 is also one type of an optical transceiver module, which is used as an optical media converter module performing both transmitting and receiving functions with a single optical fiber.

Further, as shown in FIG. 13, the optical receptacle may be configured to have a concave structure 11a capable of inserting/extracting an optical connector with D (diameter) 2.5 mm, such as an SC connector or an FC connector.

According to the card type optical transceiver module of the present invention, it is possible to achieve a thinned and compact module.

In addition, the present invention has the following effects. By achieving the thinned and compact module, an optical transmission device can be miniaturized. Besides, an optical transmission device installed in the station can integrate multiple optical transceiver modules. Further, even in a case that the optical transceiver modules in an optical transmission device installed in the station are highly integrated, the optical fiber cables may be handled in the active condition due to the plug-in structure.

The present invention is configured to have a childboard and a motherboard separately. Therefore, the childboard and the motherboard are inspected after assembled respectively, and only the boards exhibiting good quality are thrown into the subsequent assembling step. This enables to remove faulty childboards or motherboards before completing the module, contributing to lower the product price. Further, since the optical receptacle is attachable to the childboard, it is possible to easily correspond to various kinds of optical connectors required for optical transceiver modules, by preparing optical receptacles corresponding to various kinds of optical connectors.

The present invention is so configured that the through holes are provided in either one of the motherboard or the childboard and pins are provided on the other, and the pins and the through holes are connected on a condition that the pins are inserted into and penetrate the through holes, and the distance between the motherboard and the childboard is set according to the penetrating lengths of the pins inserted into the through holes. Accordingly, by adjusting the penetrating lengths of the pins inserted into the through holes, various kinds of optical modules having different sizes can be mounted and the positioning can be achieved with high precision since errors in sizes may be absorbed.

In other words, the position of the photoelectric component in a heightwise direction is set according to the lengths of the pins. Therefore, the lengths of the pins are designed optionally in order to allow the position of the photoelectric component to be the desired height. Further, it is possible to set the extract position in a heightwise direction of the optical fiber mounted on the childboard to an optional position, by changing the penetrating lengths of the pins inserted into the through holes and fixing them. For example, in a case that an optical fiber is extracted from the center of an housing with 5 mm height, the lengths of the pins are so designed that the extracting position of the optical fiber comes to 2.5 mm, in order to ensure the intensity of the thinned optical receptacle.

The size of the through hole in the present invention is formed to have a space between the pin when it is inserted and penetrates. Accordingly, by adjusting the positions of the pins inserted in the through holes, various kinds of optical modules having different sizes can be mounted and the positioning can be achieved with high precision since errors in sizes may be absorbed.

In other words, the diameter of the through hole is first set to be larger than that of the pin, then, at the time of fixing the childboard and the motherboard, it is designed to be an optional value with a freedom in all directions. For example, in a structure where the positions of the optical receptacle and the socket type electrical connector have been set, irregularities of the parts precision or slight positioning deviations in assembling may be absorbed at the fixed positions of the pins, since the fixing parts have a freedom due to the structure in which the pins are inserted into the through holes and fixed.

In the present invention, the optical receptacle is reinforced, so that a stress generated in the optical receptacle upon inserting/extracting or oscillating the optical fiber may be absorbed into the both widthwise sides of the optical receptacle. Therefore, decreasing in intensity caused by thinning may be restricted.

Further, the stress generated in the optical receptacle upon inserting/extracting or oscillating the optical fiber may be absorbed into the reinforcement materials provided on both sides of the connecting part between the optical receptacle and the childboard. Therefore, decreasing in intensity caused by thinning may be restricted.

In other words, the columnar stems are provided beforehand on a part of the childboard where the optical receptacle contacts, in order that the stress, caused upon inserting the optical connector into the optical receptacle, is to be applied after dispersed in the childboard. With this configuration, the stress applied from outside at the time of inserting/extracting the optical connector, can be dispersed all over the card type optical transceiver module through the stems provided on the childboard.

The housing of the present invention may be a CF card type or a PC card type. By diverting the components which are in mass-production, a compact and thinned modules can be realized, as well as the lower price. Further, the components for the CF card or the PC card can also be used in electronic devices into which the optical transceiver module of the present invention is mounted, which also leads to the lower price. Moreover, by integrating the components for an optical transmission device such as a transmission control LSI in a general purpose CF/PC adapter card, and by inserting an optical transceiver module of a CF card size into the CF/PC adapter card, a compact and thinned optical transmission device of a PC card size may be configured.

What is claimed is:

1. A card type optical transceiver module comprising:
an optical receptacle having a photoelectric component for converting, an electrical signal into an optical signal, and in reverse, an optical signal into an electrical signal, respectively;
an electrical connector electrically connected to an electronic device;
a motherboard and a childboard, which are separately formed and electrically connect the optical receptacle and the electrical connector;
a first cutaway portion provided in the motherboard; and
a group of pins electrically connect the motherboard and the childboard; wherein
the optical receptacle is supported in a housing which forms an outer contour of the card type optical transceiver module,
the first cutaway portion accepts the optical receptacle inside so as to avoid an interference between the optical receptacle and the motherboard,
the electrical connector is disposed on an edge surface of the housing.

2. The card type optical transceiver module as claimed in claim 1, wherein the childboard is supported in the housing at a position below the motherboard but between the electrical connector and the optical receptacle.

3. The card type optical transceiver module as claimed in claim 1, wherein there is a gap between an inner perimeter of a through hole provided in either one of the motherboard or the childboard and an outer perimeter of a pin among the group of pins which is inserted into and penetrates the through hole.

4. The card type optical transceiver module as claimed in claim 3, wherein a distance between the motherboard and the childboard is adjusted according to a penetrating length of the pin inserted into the through hole.

5. The card type optical transceiver module as claimed in claim 1, wherein the housing may be a CF card type or a PC card type.

6. The card type optical transceiver module as claimed in claim 1, wherein the optical receptacle incorporated in the housing is reinforced against an external force with a reinforcement material.

7. The card type optical transceiver module as claimed in claim 1, wherein the motherboard has a second cutaway portion, into which an electronic component mounted on the childboard is accepted.

8. The card type optical transceiver module as claimed in claim 1, wherein an optical waveguide board of the optical receptacle is mounted on the childboard, and the photoelectric component includes a photo diode for reception, a laser diode for transmission, and a photo diode for monitoring output power of the laser diode.

9. The card type optical transceiver module as claimed in claim 8, wherein the optical module includes a WDM filter which reflects either one of an received light or a transmitting light and allows another one to penetrate in accordance with each wave length.

10. The card type optical transceiver module as claimed in claim 8, wherein the optical receptacle is configured in such a manner that an optical fiber is inserted and fixed in a V-shaped groove of the optical waveguide board.

11. The card type optical transceiver module as claimed in claim 1, wherein the optical receptacle has a multi-core bi-directional transmission in which a transmission and a reception are performed via a plurality of independent optical fibers.

12. The card type optical transceiver module as claimed in claim 1, wherein the optical receptacle has a single-core bi-directional transmission in which a transmission and a reception are performed via a single optical fiber.

13. The card type optical transceiver module as claimed in claim 1, wherein the childboard is provided with a stress dispersing unit which disperses a stress from the optical receptacle.

14. The card type optical transceiver module as claimed in claim 1, wherein the electrical connector is such a type as being connected through convexes and concaves formed by pins.

15. The card type optical transceiver module as claimed in claim 1, wherein the childboard is supported by the housing, and the motherboard is supported by the group of pins and incorporated in the housing.

* * * * *